United States Patent [19]

Graham

[11] Patent Number: 4,592,400
[45] Date of Patent: Jun. 3, 1986

[54] CLAMPING APPARATUS FOR A POWER JOINTER

[76] Inventor: John A. Graham, Rte. 2, Box 207, Cadiz, Ky. 42211

[21] Appl. No.: 723,562

[22] Filed: Apr. 15, 1985

[51] Int. Cl.$^4$ ................................................ B27C 1/12
[52] U.S. Cl. .................................. 144/253 E; 83/437; 83/425; 144/117 B; 144/253 B
[58] Field of Search ........... 144/117 R, 117 B, 253 R, 144/253 A, 253 B, 253 E; 83/438, 437, 425, 421

[56] References Cited

U.S. PATENT DOCUMENTS

| | | |
|---|---|---|
| 695,228 | 3/1902 | Oakley . |
| 2,569,613 | 10/1951 | Lehr .................................. 144/253 E |
| 2,758,617 | 8/1956 | Taylor . |
| 4,026,173 | 5/1977 | Livick . |
| 4,128,029 | 12/1978 | Gay et al. . |

*Primary Examiner*—W. D. Bray
*Attorney, Agent, or Firm*—Wood, Herron & Evans

[57] ABSTRACT

An apparatus adapted for use with a power jointer having a bed and rotatable cutting blade provides precise, finish cuts on the end edges of boards so as to form good joints in picture frames, window casings, door casings and the like. The apparatus includes a fixed support rail mounted atop the bed and above the cutting blade. A holder, movable with respect to the bed along the support rail, clamps the board on end so that its end edge is disposed substantially parallel to and immediately above the bed for movement over the cutting blade to plane the end edge. Several holders according to this invention are utilized to obtain the desired angle of cut on the end edge of the board. Each separate holder includes at least one clamping surface disposed at an angle relative to the bed, e.g., 90°, 45° or 22½°, against which the side edge of the board is mounted to obtain a finish cut of the desired angle at the end edge of the board.

10 Claims, 4 Drawing Figures

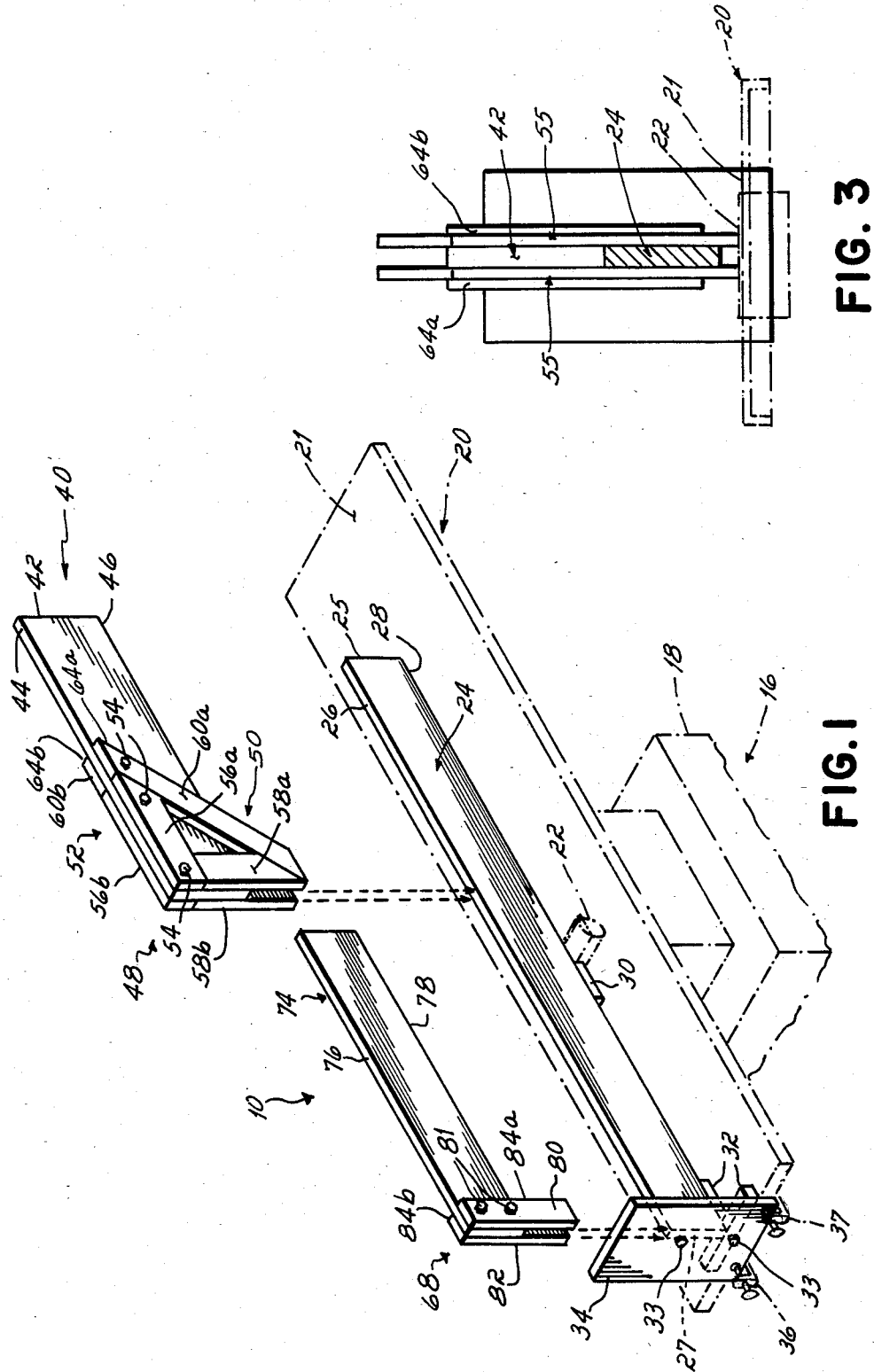

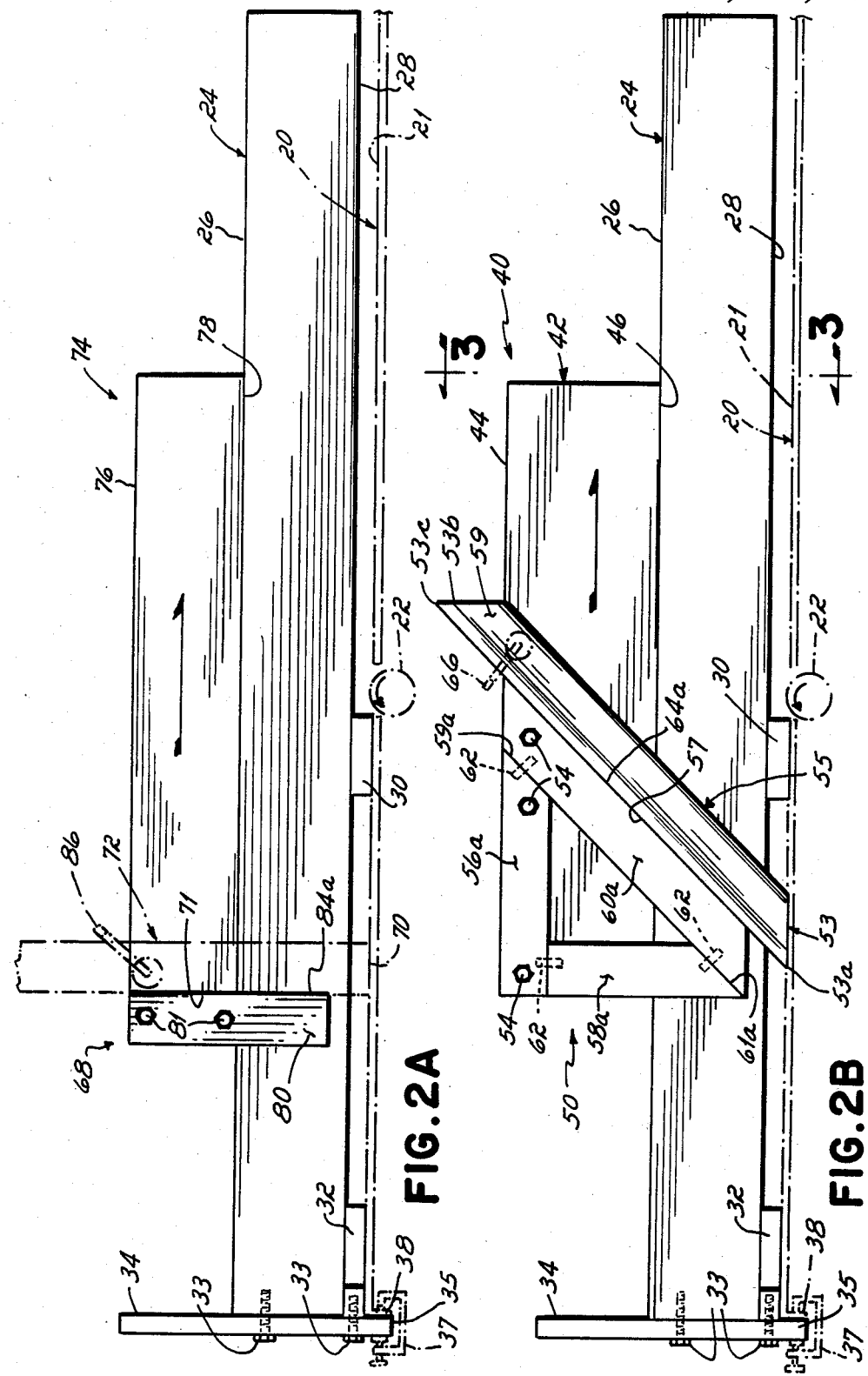

CLAMPING APPARATUS FOR A POWER JOINTER

BACKGROUND OF THE INVENTION

This invention relates to power jointers, and, more particularly, to a clamping apparatus adapted to be mounted to a power jointer for making a smooth, finish cut on an end edge of a board.

One of the most difficult problems in woodworking is to obtain closely fitting joints between the mating edges of pieces of wood. Whether the pieces of wood are connected square to one another, or at angles such as 45° or 22½°, even the slightest variation between the mating surfaces can produce a poor joint. This is a particular problem in the fabrication of frames, cabinets, tables and other items where the joints are especially noticeable.

In the construction of rectangular or square picture frames, for example, a miter box is commonly used to obtain the 45° cuts on the mating edges of the boards forming the frame sections. As is well known, a miter box generally includes a frame having a bed and back plate connected together in an L-shape, and a carriage adapted to support a saw which is positionable relative to the bed at various angles. Although in some circumstances a miter box can produce reasonably accurate 45° cuts, it has several disadvantages. For instance, if the boards to be cut are quite long, it is difficult to support the board within the bed of the miter box and against its back plate while making the cut. Movement of the board relative to the bed or back plate during the cut results in an uneven edge. In addition, even though the saws of miter boxes usually have relatively fine teeth, the cut edges it produces are often rough and must be made smoother with sandpaper or a block plane.

Another problem with making angled or straight cuts along the edge of a board with a miter box or similar tool is that it is difficult to correct a cut which is uneven or which has been made at an incorrect angle. It is extremely difficult to cut a very thin sliver or section of wood from the edge of a board with a miter box to correct a poor cut. It is also difficult, and time consuming, to attempt to straighten a poor cut using a block plane, sandpaper, or similar means.

Power jointers and other types of power planar tools are frequently used to smooth edges of boards which have been rough cut, particularly the long or side edges of boards used for finish work, e.g., door and window frames in a house or other building. Power jointers have not been useful in cutting the end edges of boards, particularly at angles such as 45°, because of the difficulty in holding a board on end against the bed of the jointer and then moving the board over the cutting blade of the jointer without tipping the edge with respect to the bed and cutting blade.

SUMMARY OF THE INVENTION

It is therefore among the object of this invention to provide an apparatus for obtaining smooth, accurate finish cuts along the end edges of boards with a power jointer, which is adapted to mount upon the bed of a standard power jointer, which accommodates workpieces having square or 90° edges and angled edges such as 45° or 22½° edges, which is adapted to cut right and left-hand angled edges of a board and which is adapted to cut two boards in a simultaneous operation.

These objectives are accomplished in an apparatus according to this invention which comprises a support rail adapted to be mounted atop the bed of a power jointer having a rotatable cutting blade extending above the plane of the bed. A holder, which is slidable along the upper surface of the support rail, includes a leading edge defining a clamping surface. The board is clamped to the holder so that its side edge rests against the clamping surface of the holder and its end edge to be cut is disposed substantially parallel to the plane of the bed. The board is movable with the holder along the support rail so that its end edge passes over the cutting blade to produce a precise, finish cut along such end edge.

More specifically, the apparatus of this invention includes a support rail which is a generally rectangular-shaped plate mounted on edge atop the jointer bed so that its bottom edge extends along and faces the bed of the jointer. A plurality of holders are provided depending on the angle at which the edge of the board is to be cut. For example, the holder for obtaining a square or 90° finish cut on the end edge of a board comprises a guide rail in the form of a rectangular plate which is mounted atop and slidable along the top edge of the support rail. Mounted to either side of the guide rail, and straddling the support rail, are a pair of vertical arms. Each of the vertical arms is formed with a leading edge disposed perpendicularly to the bed, which define clamping surfaces.

In order to obtain a square cut at the end edge of a board, one side edge of the board is clamped against the leading edge of one of the vertical legs so that its end edge is disposed parallel to, and immediately above, the bed. The holder and clamped board are then slid along the support rail so that the end edge of the board moves across the cutting blade of the jointer to produce a precise 90° finish cut along the end edge of the board.

Smooth and accurate finish cuts of 45° and 22½° are obtained with holders according to this invention which are generally similar to the 90° holder described above. Each angled holder generally comprises a guide rail slidable along the top edge of the support rail, and a carriage connected to the guide rail which straddles the support rail. The carriage includes arms on opposite sides of the guide rail which are each formed with a leading edge disposed at a 45° (or 22½°) angle with respect to the horizontal bed of the jointer. By clamping the side edge of the board against the leading edge of one of the arms of the carriage, the angled end edge of the board to be cut is disposed substantially parallel to, and immediately above, the bed. The carriage and guide rail of the angled holder are then slid along the fixed support rail to advance the board over the cutting blade of the jointer and obtain a precise angled cut on the end edge of the board.

The apparatus of this invention for use with a power jointer achieves precise, finish cuts of essentially any desired angle on the end edges of boards. Preferably, the ends of the board are already rough cut along the desired angle. The boards are then securely clamped on end by one of the holders of this invention so that the end edge of the board is substantially parallel to the plane of the bed of the jointer. Movement of the holders along the fixed support rail insures that the end edge of the board to be cut is advanced over the cutting blade at a precise angle. Imprecise cuts obtained with miter boxes or other tools can thus be eliminated without the use of sandpaper, block planes or other hand tools. In addition, block planes or other hand tools. In addition, the cuts obtained with this invention are much smoother than is possible with a miter box which results in a better fit between the ends of mating boards.

DESCRIPTION OF THE DRAWINGS

The structure, operation, and advantages of a presently preferred embodiment of this invention will become further apparent upon consideration of the following description taken in conjunction with the accompanying drawings, wherein:

FIG. 1 is an exploded perspective view of the apparatus of this invention mounted to a conventional jointer, including two examples of the holders herein;

FIG. 2A is an assembled side view of this invention with a 90° holder;

FIG. 2B is an assembled side view of the apparatus of this invention with a 45° holder; and FIG. 3 is an end view of the apparatus herein taken generally along line 3—3 of FIG. 2B.

DETAILED DESCRIPTION OF THE INVENTION

Referring now to the drawings, the apparatus 10 of this invention is operable to provide a precise, finish cut at the end edge of a board in cooperation with a power jointer 16 of known construction. As schematically shown in FIG. 1, the power jointer 16 includes a base 18, a bed 20 mounted atop the base 18, and a cutting blade 22 which is vertically adjustable to extend above the horizontal plane defined by the top 21 of the bed 20. As shown in FIG. 3, the cutting blade 22 extends across a substantial portion of the width of bed 20. The apparatus 10 of this invention is operable to first securely clamp a board so that its end edge is positioned parallel to, and immediately above, the bed 20, and then to pass the end edge of the board over the cutting blade 22 to achieve a precise, finish cut therealong.

The apparatus 10 includes a support rail 24 which extends longitudinally along a major portion of the length of jointer bed 20. The support rail 24 is formed in a rectangular shape, preferably of aluminum bar stock, and includes upper and lower surfaces 26, 28, respectively, and forward and rearward ends 25, 27, respectively. As used herein, "forward" refers to a direction toward the forward end 25 of support rail 24 to the right of cutting blade 22 as viewed in FIG. 1, and "rearward" refers to the opposite direction toward the rearward end 27 of support rail 24. The support rail 24 is mounted on edge atop the bed 20 so that its lower surface 28 faces the top surface 21 of bed 20.

In order to avoid interference between the support rail 24 and the vertically upwardly extending cutting blade 22, forward and rearward spacer blocks 30, 32, respectively, are positioned between the top 21 of bed 20 and lower surface 28 of support rail 24 to raise the support rail 24 approximately ⅛" above the bed 20.

In an alternative embodiment, a notch (not shown) is formed in the lower surface 28 of support rail 24 from a point where the forward spacer block 30 is shown in FIG. 1, to its forward end 25. This permits the rearward portion of support rail 24 to rest directly on bed 20, while preventing contact of the cutting blade 22 with the forward portion of support rail 24. The notch is required along the entire forward portion of support rail 24, and not just in the area of the cutting blade 22, because in some power jointers the bed rearwardly of the cutting blade is vertically adjustable with respect to the forward portion of the bed. In such jointers, if the rearward portion of the bed were adjusted vertically downwardly, interference between the cutting blade and support rail 24 could occur.

Support rail 24 is mounted in a fixed position to bed 20 by an end plate 34 and a pair of C-clamps 36, 37. The end plate 34, preferably formed of aluminum bar stock, is connected perpendicularly to the rearward end 27 of support rail 24, and to the rearward spacer block 32, by bolts 33. The lower edge 35 of end plate 34 is disposed against a downwardly extending flange 38 formed at the rearward end of bed 20, see FIGS. 2A and 2B. The end plate 34, and, in turn, support rail 24, are thus secured to the bed 20 by the C-clamps 36, 37 which clamp the lower end 35 of end plate 34 to the bed flange 38. Although C-clamps 36, 37 are illustrated in the drawings, it is contemplated that any other suitable type of clamping apparatus could be utilized to clamp end plate 34 to the bed 20. In addition, the end plate 34 could be directly connected to the bed 20 by bolts, screws or other suitable fasteners.

Referring now to FIG. 1, the holders according to this invention are illustrated in a position immediately before being mounted atop the support rail 24. As discussed below, several holders are provided in accordance with this invention for making various angled cuts on the end edge of a board, including square or 90° cuts, and angled cuts such as 45° or 22½°.

Referring now to FIGS. 1 and 2B, a holder 40 for producing a 45° finish cut is illustrated. The 45° holder 40 includes a guide rail 42 which is preferably rectangular in shape and is formed with upper and lower edges 44, 46, respectively. The guide rail 42 is preferably formed of aluminum bar stock, although other rigid materials could be utilized such as wood. A carriage 48 straddles the guide rail 42 and comprises a pair of half-sections 50, 52 mounted to opposite sides of the guide rail 42 with bolts 54 or other fasteners.

The half-section 50 includes a horizontal arm 56a extending along the guide rail 42, a vertical arm 58a connected perpendicularly with respect to the horizontal arm 56a and guide rail 42, and an angled arm 60a connected between the horizontal and vertical arms 56a, 58a. The forward edge 59a of horizontal arm 56a, and the bottom edge 61a of vertical arm 58a, are formed at 45° angles so that the angled arm 60a connected thereto is disposed at a 45° angle relative to each arm 56a, 58a and to guide rail 42. The half-section 52 is identical to half section 50, and its elements are identified herein with the same reference numerals accompanied by the letter "b". In a presently preferred embodiment of this invention, all arms of carriage 48 are formed of wood an interconnected with pegs 62 as shown in FIG. 2B. Alternatively, the arms of carriage 48 could be formed of aluminum bar stock and interconnected by welding, brazing or other suitable means.

Referring now to FIG. 2B, in order to make a finish cut on the 45° end edge 53 of a board 55, the holder 40 is first positioned atop the support rail 24. The thickness of guide rail 42 is the same as that of support rail 24 so that the half-sections 50, 52 of carriage 48, mounted on opposite sides of guide rail 42, straddle the support rail 24 and the lower edge 46 of guide rail 42 rests against the upper surface 26 of support rail 24. Since the guide rail 42 is parallel to the top 21 of the bed 20 in the assembled position, the angled arms 60a, 60b of holder 40 are disposed at a 45° angle with respect to the top 21 of bed 20. The leading or forward edges 64a, 64b of angled arms 60a, 60b, respectively, each define a board clamping surface for mounting a board 55 to holder 40 at a 45° angle relative to the bed 20.

In order to make a finish cut on the 45° end edge 53 of board 55, the side edge 57 of the board 55 is positioned along the leading edge 64a of angled arm 60a so that its end edge 53 is disposed immediately adjacent the bed 20. The board 55 is then clamped on end, with its side edge 57 against the leading edge 64a of arm 60a, by a C-clamp 66. The C-clamp 66 firmly clamps against the face 59 of board 55 and the guide rail 22 of 45° holder 40. The 45° holder 40, and board 55, are then advanced toward the cutting blade 22 with the lower edge 46 of guide rail 42 sliding along the upper surface 26 of support rail 24. The end edge 53 of the board 55 passes over the upstanding cutting blade 22 to obtain a precise 45° finish cut on such edge 53.

As illustrated in the drawings, the end edge 53 of board 55 had previously been cut at approximately a 45° angle prior to mounting on the apparatus 10 of this invention. Therefore, the end edge 53 of board 53 is substantially parallel to the bed 20 when mounted to 45° holder 40. It is contemplated that the apparatus 10 of this invention is most useful for making finished or smooth cuts on a board 55 which has already been roughly cut by some other apparatus, such as a miter box. In this manner, a precise, finish cut is obtained with apparatus 10 to form better joints. It is possible that the apparatus 10 could be utilized to produce, for example, 45° or other angled cuts on a board whose ends are not approximately 45° to begin with. This would require several passes of the board along cutting blade 22, and the board would have to be repositioned along the 45° holder 40 to keep the end of the board near the bed 20 as the cut was being made.

As mentioned above, the 45° holder 40 could be made into a workpiece holder for other angled cuts by modifying the construction of carriage 48. For example, in order to obtain a 22½° cut on the end edge of a board, the leading edges 64a,b of angled arms 60a,b must be disposed at an angle of 22½° with respect to the top 21 of bed 20. This is accomplished by changing to 22½° the angles of the forward edge 59a of horizontal arm 56a, and the bottom edge 59a of the vertical arm 58a, which contact the angled arm 60a of carriage 48. The same modification is made for the arms 56b, 58b of half section 52.

A square or 90° cut on the end edge 70 of board 72 is obtained with the 90° holder 68 shown in FIGS. 1 and 2A. The 90° holder 68 includes a guide rail 74, preferably formed of aluminum bar stock, having an upper edge 76 and a lower edge 78. A pair of vertical arms 80 and 82 are mounted on opposite sides of the guide rail 70 by bolts 81. When mounted atop the support rail 24, the vertical arms 80, 82 straddle the support rail 24 and the lower edge 78 of guide rail 74 contacts the upper surface 26 of support rail 24 as shown in FIG. 2A. The leading edges 84a,b of vertical arms 80, 82, respectively, each form a support surface against which the side edge 71 of board 72 is mounted so that the end edge 70 to be cut is disposed parallel to, and immediately above, the bed 20 in preparation for a cutting operation. A C-clamp 86 is used to clamp the board 72 to the guide rail 74 of holder 68 for movement of the board 72 with holder 68. In order to make a square or 90° cut on end edge 70, the lower edge 74 of guide rail 70 is slid along the upper surface 26 of support rail 24, to move the end edge 70 of board 74 over the cutting blade 22 of the jointer 16.

As shown in FIG. 3, the apparatus 10 of this invention is capable of making cuts on two boards 55 simultaneously. The support rail 24 is preferably disposed at about the center of cutting blade 22 so that it extends on either side of support rail 24. Two boards 55 are each clamped to one of the leading edges 64a, 64b of the 45° holder 40, and then the 45° holder is movable over cutting blade 22. This enables two 45° cuts to be made at the same time. Two boards 72 are cut with the 90° holder 68 in the same manner.

In addition, both right and left-hand 45° cuts may be made with the 45° holder 40 of this invention. As shown in FIG. 2B, the board 55 is clamped in place against the leading edge 64a of 45° holder 40 so that the pointed end 53a of its 45° end edge 53 faces rearwardly and engages the cutting blade 22 last during a cutting operation. This helps avoid splintering of the pointed edge 53a as it is cut. Many boards 55 used for making frames have a contoured outer face 59 formed with ribs and the like (not shown). Only the back surface of such boards 55 are planar and may be firmly clamped against the guide rail 22. Therefore, in order to cut the opposite end edge 53b of board 55, so that its pointed end 53c contacts the cutting blade 22 last, the board 55 is turned end-for-end and mounted to the leading edge 64b of the angled arm 60b on the opposite side of 45° holder 40. This permits the board 55 to be moved past the cutting blade 22 with the pointed end 53c of its end edge 53b trailing. Therefore, the apparatus of this invention is capable of making both right and left-hand angled cuts on the end edges 53, 53b of board 55 by simply switching the side on which the board 55 is mounted to the carriage 48 of 45° holder 40.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. Apparatus for planing an end edge of a board with a power jointer having a bed and a rotatable cutting blade extending above the plane of the bed, comprising:
    a support rail adapted to be mounted atop the bed;
    holder means mounted upon said support rail, said holder means clamping the board so that an end edge of the board is disposed immediately above the plane of the bed;
    said holder means being movable with respect to the bed along said support rail for passing the end edge of the baord over the cutting blade to plane the end edge.

2. The apparatus of claim 1 in which said support rail is a rectangular plate having top and bottom edges, said plate being mounted atop the bed so that said bottom edge faces the bed.

3. The apparatus of claim 2 further including at least one spacer block positioned between the bed and said bottom edge of said plate for elevating said plate above the plane of the bed so as to avoid interference with the cutting blade.

4. The apparatus of claim 1 in which the board includes a side edge, the side edge and end edge of the board forming an angle therebetween, said holder means being formed with a clamping surface disposed at an angle with respect to the bed which is substantially equal to said angle between the side and end edges of the baord, the side edge of the board being clamped against said clamping surface of said holder means to dispose the end edge of the board substantially parallel to the bed.

5. The apparatus of claim 1 further including an end plate connected to one end of said support rail transverse to the longitudinal axis thereof, said end plate being connected to an edge of the bed of the jointer for supporting said support rail atop the bed.

6. Apparatus for planing an end edge of a board with a power jointer having a bed and a rotatable cutting blade extending above the plane of the bed, comprising:
a support rail adapted to be supported atop the bed and cutting blade, said support rail having a top surface and a bottom surface facing the bed;
holder means mounted to said support rail and being movable with respect to the bed along said top surface of said support rail, and holder means having at least one clamping surface;
clamping means for mounting the board against said clamping surface so that an end edge of the board is disposed substantially parallel to and immediately above the plane of the bed;
said holder means and the board being movable with respect to the bed along said support rail for passing the end edge of the board over the cutting blade to plane the end edge of the board.

7. The apparatus of claim 6 in which the board includes a face and a side edge disposed at a 90° angle to the end edge, said holder means comprising:
a guide rail, and a pair of arms mounted on opposite sides of said guide rail;
said guide rail and said arms being movable along said support rail, said guide rail sliding along said top surface of said support rail and said arms straddling said support rail;
each of said arms having a leading edge disposed at a 90° angle with respect to the bed, said leading edges each forming a clamping surface;
said clamping means mounting the board to said guide rail so that the side edge of the board rests against at least one of said clamping surfaces of said arms and the end edge of the board is disposed substantially parallel to the bed for making a square, 90° cut along the end edge of the board.

8. The apparatus of claim 7 in which said clamping means is a C-clamp adapted to clamp the face of the board to said guide rail and the side edge of the baord against said clamping surfaces.

9. The apparatus of claim 6 in which the board includes a face and a side edge disposed at an acute angle to the end edge, said holder means comprising:
a guide rail, and a carriage connected to said guide rail, said carrige including a pair of spaced half-sections, each of said half-sections having interconnected vertical, horizontal and angled arms, said half-sections being mounted on opposite sides of said guide rail;
said guide rail and said carriage being movable along said support rail, said guide rail sliding along said top surface of said support rail and said half-sections of said carriage straddling said guide rail;
each of said angled arms of said carriage having a leading edge disposed at an acute angle with respect to the bed, said leading edges each forming a clamping surface;
said clamping means mounting the board to said guide rail so that the side edge of the board rests against at least one of said clamping surfaces of said angled arms of said carriage and the end edge of the board is disposed substantially parallel to the bed for making an angled cut along the end edge of the board.

10. The apparatus of claim 9 in which said leading edges of said angled arms of said carriage are disposed at a 45° angle relative to the bed, the end edge of the board being cut at an acute angle of 45°.

* * * * *